United States Patent
Haag et al.

(10) Patent No.: US 7,151,350 B2
(45) Date of Patent: Dec. 19, 2006

(54) POWERED DOOR OBJECT DETECTION SYSTEM AND METHOD

(75) Inventors: Ronald Helmut Haag, Clarkston, MI (US); Jeremy M Husic, Washington, MI (US); John Pasiecznik, Jr., Malibu, CA (US)

(73) Assignee: Delphi Technologies, Inc., Troy, MI (US)

( * ) Notice: Subject to any disclaimer, the term of this patent is extended or adjusted under 35 U.S.C. 154(b) by 55 days.

(21) Appl. No.: 10/776,675

(22) Filed: Feb. 11, 2004

(65) Prior Publication Data

US 2005/0174077 A1   Aug. 11, 2005

(51) Int. Cl.
*H02P 1/00* (2006.01)
*H02P 1/22* (2006.01)
*H02P 1/40* (2006.01)
*H02P 3/00* (2006.01)
*H02P 3/20* (2006.01)

(52) U.S. Cl. ............... 318/280; 318/282; 318/443; 318/445; 318/466; 318/468

(58) Field of Classification Search .......... 318/280, 318/466, 469
See application file for complete search history.

(56) References Cited

U.S. PATENT DOCUMENTS 5,396,158 A * 3/1995 Long et al. ............... 318/282
5,563,483 A * 10/1996 Kowall et al. ............ 318/283
5,982,126 A * 11/1999 Hellinga et al. .......... 318/468
6,676,186 B1 * 1/2004 Greif ........................ 296/50
2001/0042989 A1   11/2001 Greif
2002/0074959 A1 * 6/2002 Van Wiemeersch ...... 318/445
2005/0151495 A1 * 7/2005 Miyauchi ................. 318/469

FOREIGN PATENT DOCUMENTS

| DE | 19813025 | 9/1999 |
|----|----------|--------|
| DE | 10132886 | 1/2003 |
| WO | WO/03/038220 | 5/2003 |

OTHER PUBLICATIONS

European Search Report dated Apr. 15, 2005.

* cited by examiner

*Primary Examiner*—Lincoln Donovan
*Assistant Examiner*—Erick Glass
(74) *Attorney, Agent, or Firm*—Jimmy L. Funke

(57) ABSTRACT

A non-contact detection system and method for detecting obstructions in relation to a powered door on a vehicle such that contact with the door may be prevented. The detection system includes an object detection sensor located on the powered door for sensing an object within an adjustable sensing zone. A door position sensor senses position of the door relative to at least one of an open and closed door position. A controller adjusts the sensing zone of the object detection sensor as a function of the sensed door position.

25 Claims, 4 Drawing Sheets

POWERED DOOR OBJECT DETECTION SYSTEM AND METHOD

TECHNICAL FIELD

The present invention generally relates to a powered door on a vehicle and, more particularly, relates to detecting obstructions in the moving direction of a powered door on a vehicle.

BACKGROUND OF THE INVENTION

Automotive vehicles are increasingly being equipped with powered doors, which generally include a powered actuator, such as an electric motor, for opening and closing a door on the vehicle. For example, some vehicles, such as minivans, employ one or two powered side doors located at the sides of the vehicle. It has also been proposed to equip certain vehicles, such as sport utility vehicles (SUVs) and minivans, with a powered lift gate door at the rear of the vehicle. The powered lift gate would employ an electric motor or other powered actuator to forcibly actuate the lift gate between open and closed door positions.

Conventional vehicle powered doors typically have an electric motor that reverses direction only when the powered door comes into forcible contact with an obstacle. However, contact of the powered door with an obstacle may cause discomfort to obstructing persons, damage to the obstructing objects, and/or damage to the powered door itself. It is therefore generally undesirable for a powered door to come into contact with a person or other obstacles when the powered door is actuated in the moving direction.

Accordingly, it is therefore desirable to provide for the detection of an obstacle in close proximity to a powered door in a manner that reduces the likelihood of the powered door contacting the detecting obstacle.

SUMMARY OF THE INVENTION

In accordance with the teachings of the present invention, a detection system and method are provided for detecting an object in relation to a movable door, such as a powered door on a vehicle, such that contact of the door with an obstruction may be prevented. The detection system includes an object detection sensor located on a movable door for sensing an object within a sensing zone. The sensing zone is adjustable. The system also includes a door position sensor for sensing position of the door relative to at least one of open and closed door positions. The system further has a controller for adjusting the sensing zone of the object detection sensor as a function of the sensed door position.

According to one aspect of the present invention, the movable door is a powered door on a vehicle. Upon sensing an object within the sensing zone, the controller changes movement of the door, such as reversing direction of movement of the door. According to a further aspect of the present invention, the controller prevents reversal of direction of movement of the powered door, once the powered door position reaches a predetermined position. Accordingly, the detection system advantageously detects a potential obstruction in relation to the movable door and further controls actuation of the powered door to reduce contact therewith.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
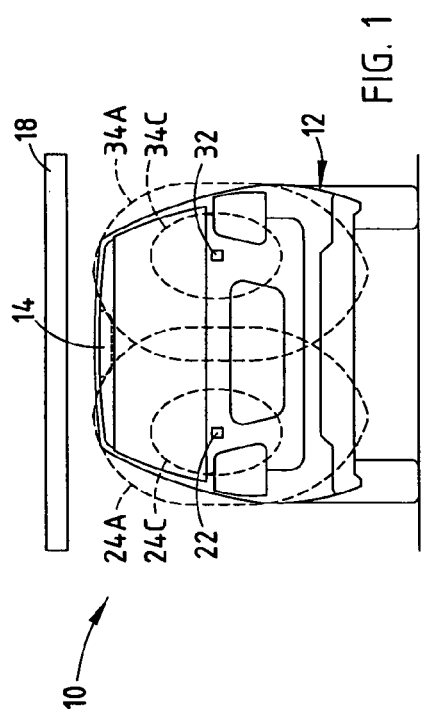
FIG. 1 is a rear view of a vehicle having a powered door (lift gate) employing an object detection system according to the present invention.
Figure 2B:
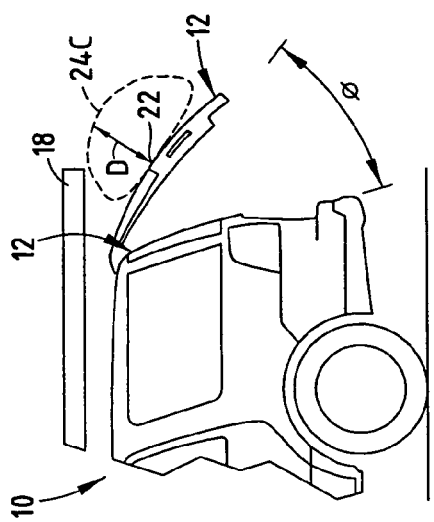
FIGS. 2A–2C are partial side views of the vehicle illustrating an adjustable radar sensing zone for detecting an object (obstruction) during opening of the powered lift gate.
Figure 2C:
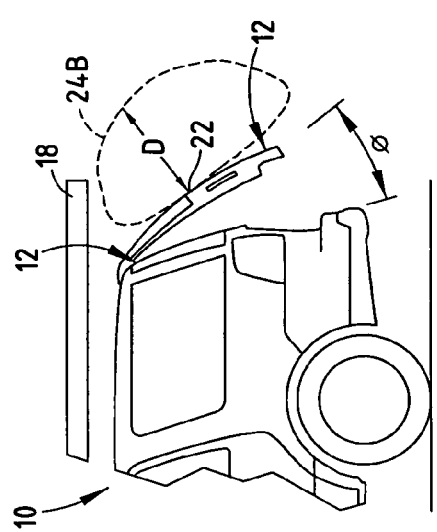
Figure 2A:
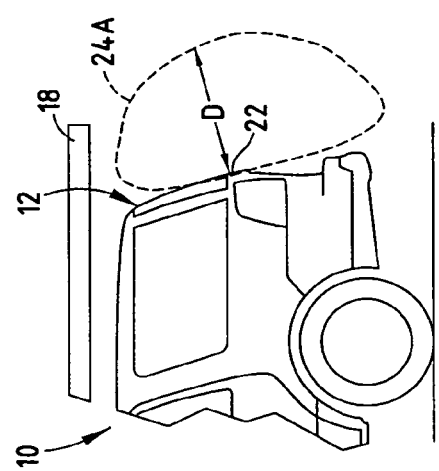
Figure 3:
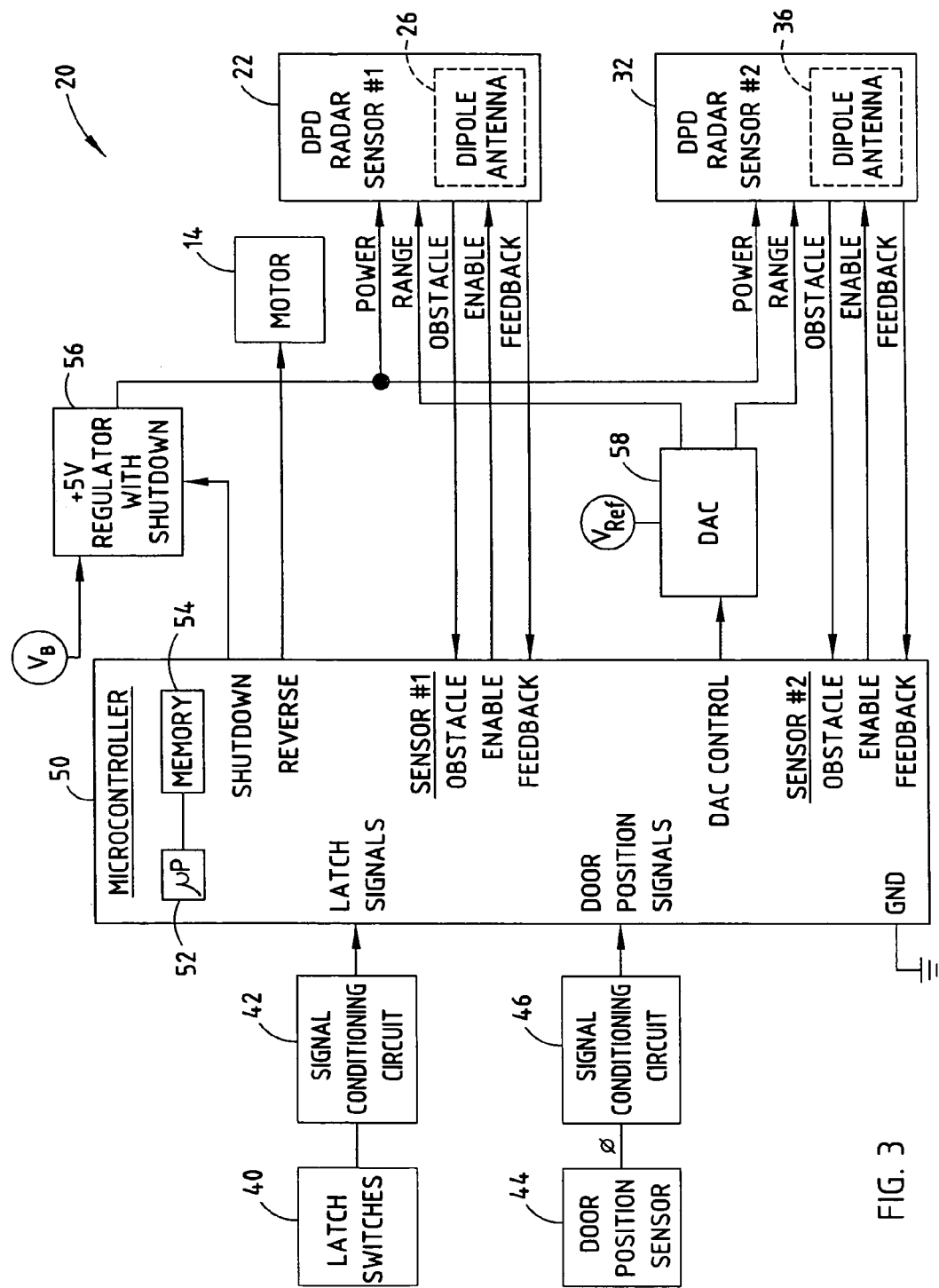
FIG. 3 is a block diagram illustrating the object detection system according to the present invention.

Referring to FIGS. 1–3, an object detection system 20 is generally illustrated for detecting the presence of an object (e.g., obstruction) in relation to a movable powered door 12 of a vehicle 10, such as an automotive vehicle. The powered door 12, as shown in FIG. 1, is the rear powered lift gate of the vehicle 10 which generally pivots (swings) about an upper horizontal axis on hinges and includes a powered actuator 14, such as an electric motor or a pneumatic actuator, for powering the lift gate 12 between open and closed door positions. The powered door 12 moves between a closed door position and a fully open door position to control exterior access to the rear storage compartment of the vehicle 10. Illustrated above the vehicle 10, is a garage door 18 which may or may not be an obstruction in the moving path of the powered door 12.

The object detection system 20 includes first and second radar sensors 22 and 32 located on the movable powered door 12. The radar sensors 22 and 32 sense the presence of object(s) within adjustable sensing zones. The first radar sensor 22 senses objects present within a first sensing zone that is adjustable in size as shown in three adjustable size zones 24A–24C, while the second radar sensor 32 senses objects present within a second sensing zone that is adjustable in size as shown in three adjustable sized zones 34A–34C. While first and second radar sensors 22 and 32 are shown and described herein, it should be appreciated that the object detection system 20 may employ any number of one or more sensors for sensing the presence of an object within one or more adjustable sensing zones in the moving path of a powered door 12 on a vehicle 10. It should also be appreciated that other sensors may be employed which may include optical sensors and ultrasound sensors, without departing from the teachings of the present invention.

The radar sensors 22 and 32 provide adjustable sensing zones which are adjusted in size and/or shape based on a sensed position of the movable door 12. With particular reference to FIGS. 2A–2C, the sensing zone of radar sensor 22 is adjustable to a number of sizes as shown by zones 24A–24C. With the movable door 12 in the closed position as shown at FIG. 2A, sensor 22 is controlled to provide a first sensing zone 24A having a bubble radius detection distance D. As the movable door 12 opens to a position beyond a predetermined position, the sensing zone of sensor 22 is adjusted to a reduced size sensing zone 24B having a reduced size bubble radius detection distance D as shown in FIG. 2B. As the movable door 12 further extends towards the fully opened door position, radar sensor 22 is adjusted to provide a further reduced size sensing zone 24C having a further reduced size bubble radius detection distance D as shown in FIG. 2C.

It should be appreciated that the sensitivity of both of radar sensors 22 and 32 are controlled based on the sensed position of the movable door 12 so as to control the size and/or shape of the radar sensing zones to detect objects that may be obstructive to opening the door 12. Accordingly, the object detection system 20 allows for the detection of objects such as the garage door 18, or other objects such as persons, pets, shopping carts, or other objects before such objects come into physical contact with the moving door 12. By adjusting sensitivity of the sensors 22 and 32, the object detection system 20 is able to ignore objects such as the raised garage door 18 which are close to the fully opened door but do not obstruct its movement to prevent false alarms which may otherwise occur with a fixed sensing zone.

Additionally, the object detection system 20 allows a controller to change the movement of the powered door 12 when an object is sensed in any one of the sensing zones. According to one embodiment, a controller changes movement to the door 12 by reversing movement of the motorized door 12 upon detecting an object sensed within one of the sensing zones.

According to another embodiment, the controller changes movement of the door 12 by halting (stopping) movement of the door 12. It should further be appreciated that when the movable door 12 exceeds a predetermined position, the change in movement of the door 12 is prevented. This allows for the situation in which the vehicle 10 is parked within a garage and the overhead garage door 18 or other overhead object (ceiling, light fixture, etc.) is in close proximity to the fully opened door 12. As a consequence, the prevention of reversing the powered door 12 further prevents false alarms which may otherwise occur.

Referring to FIG. 3, the object detection system 20 is shown including first and second radar sensors 22 and 32 having corresponding dipole antennas 26 and 36, respectively. According to one example, the first and second dipole antennas 26 and 36 may each include a patch antenna configured to provide a desired shape and beamwidth. The antenna coverage may be hemispherical, according to one example. Dipole antennas 26 and 36 allow for the transmission and reception of Doppler radar signals according to a desired field of coverage. Other types of antennas, such as horn antennas, may be employed in place of the dipole antennas 26 and 36. While first and second antennas 26 and 36 are shown and described herein, it should be appreciated that any number of one or more antennas may be employed, without departing from the teachings of the present invention.

The first and second radar sensors 22 and 32 may include any of a number of radar sensing devices for sensing objects within an adjustable sensing coverage zone local to the traveling path of the movable door 12. According to one embodiment, each of the first and second radar sensors 22 and 32 includes a low power differential pulsed Doppler (DPD) radar sensor having a dynamic range gate and operated at a frequency of about 5.8 gigahertz. One example of a commercially available DPD radar motion sensor is the Model DPD motion sensor commercially available from McEwan Technologies, LLC. According to another embodiment, the first and second radar sensors 22 and 32 may each include a pulse Doppler radar motion sensor, such as Model BBL, commercially available from McEwan Technologies, LLC. The differential pulsed Doppler sensor uses Doppler principle to detect motion and, can be adjusted within a short range, such as 0.5 meter to 4.0 meters, according to one example, by using range gating. The differential pulsed Doppler radar sensor transmits radio frequency (RF) bursts comprised of a number of cycles at a frequency of 5.8 gigahertz, and the RF burst width defines the maximum sensing distance since echoes must return before the RF burst ends so self-mixing (also known as homodyne mixing) can occur in the receiver. The differential pulsed Doppler radar sensor responds to targets within a sharply bounded region defined by its range gate. The gated region may be viewed as a sector of a bubble with a bubble radius detect distance D set by the range gate, and the angle is set by the beamwidth of the antenna. The range gate of the differential pulsed Doppler radar sensor effectively limits the detection of objects to within the sensing zone, and eliminates false triggers from large distant objects, and provides for a robust sensor.

The object detection system 20 includes a microcontroller 50 generally configured to include a microprocessor 52 and memory 54. It should be appreciated that any of a number of commercially available microprocessors may be employed that are capable of processing the inputs and one or more software routines to detect an object and controlling the powered door 12 according to the present invention. The memory 54 may include volatile and non-volatile memory as should be evident to those skilled in the art. Included in the non-volatile memory are one or more algorithms for controlling the adjustable sensing zones of the radar sensors 22 and 32, and further controlling the operation of the motor 14 actuating the powered door 12. While a single microcontroller 50 is shown and described herein, it should be appreciated that the object detection and control functions may be performed with one or more dedicated or shared controllers as should be evident to those skilled in the art. It should also be appreciated that the microcontroller 50 and other electronics may be provided in one or both of sensors 22 and 32.

The microcontroller 50 receives, as an input, latch signals which are detected by latch switches 40 and processed by signal conditioning circuit 42. The latch switches 40 detect when the powered door 12 is latched in the closed door position and serves to rezero the position count. Additionally, microcontroller 50 receives door position signals that are sensed by a door position sensor 44 and processed by a signal conditioning circuit 46. The door position sensor 44 may include an optical encoder generating a door position angle $\phi$ indicative of the angular position of the powered door 12 relative to one of the open and closed door positions.

The object detection circuit 20 further includes a five volt regulator 56 with shutdown which receives a voltage $V_B$ of approximately twelve volts (+12V) from the vehicle battery and converts the voltage $V_B$ to five volts (+5V) for powering the first and second radar sensors 22 and 32. The regulator 56 may shutdown the sensors 22 and 32 by receiving a shutdown signal from the microcontroller 50 as shown. The object detection circuit 20 also includes a digital-to-analog converter (DAC) 58 which is responsive to a DAC control signal from microcontroller 50. The DAC 58 provides a range gate voltage value based on the sensed position $\phi$ of the movable powered door 12, in order to set the sensing zone of each of radar sensors 22 and 32. The DAC 58 is set to provide a predetermined range gate voltage when the powered door 12 is in a first zone. When the powered door 12 is in a second zone, the DAC 58 provides a range gate voltage that decreases gradually based on a predetermined function. In the example shown and described herein, the rate gate voltage decreases linearly according to a linear slope function. According to one embodiment, the DAC 58 provides one hundred (100) adjustable range gate voltage values to provide a gradual transition to adjust the sensing zone of each of radar sensors 22 and 32 to one of one hundred (100) different sizes while the powered door 12 moves through the second zone.

Figure 4:
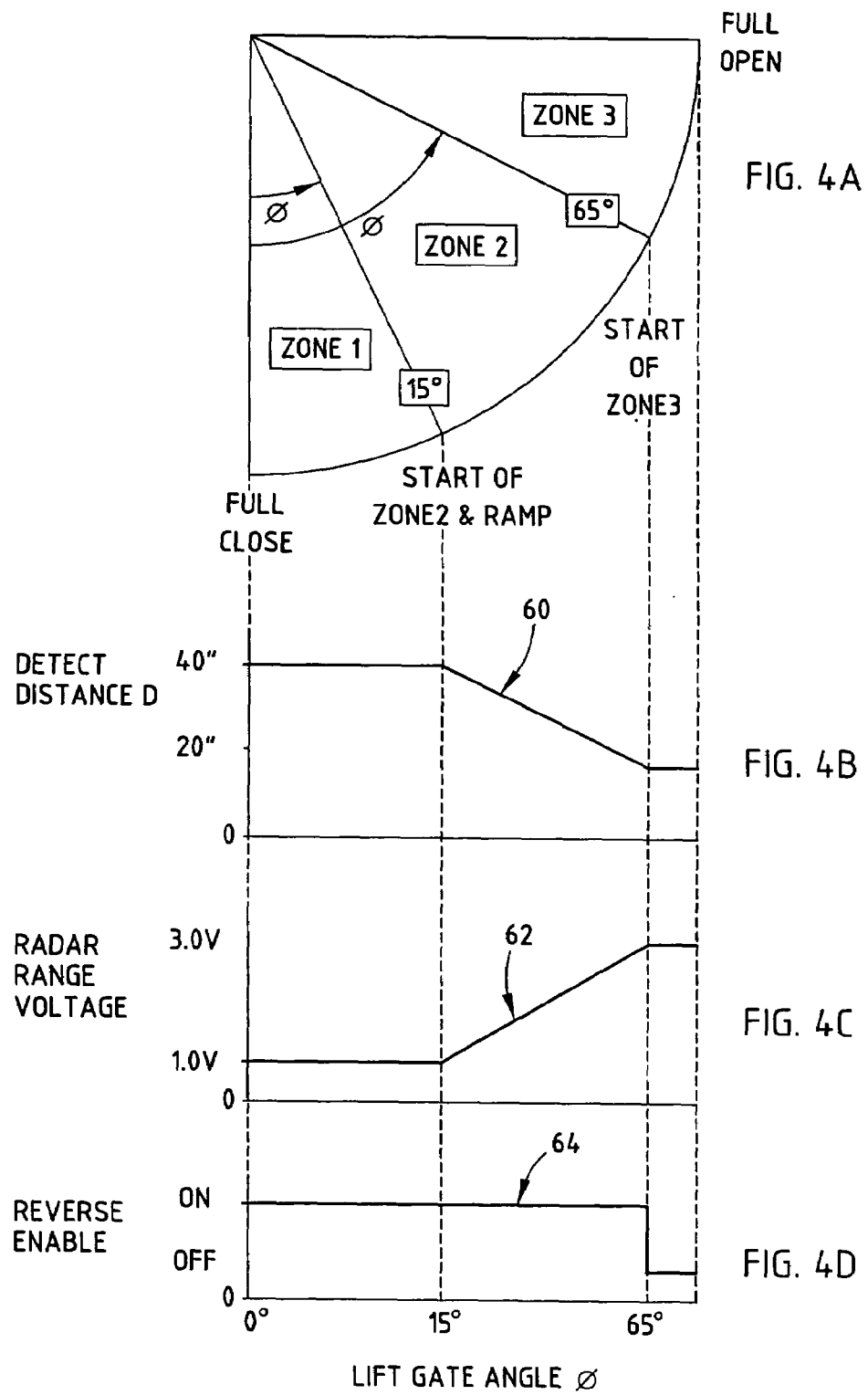
FIGS. 4A–4D illustrates control of the radar sensors and powered door based on position of the door.

Referring to FIG. 4, the sensed position of the powered door 12 is illustrated between the fully closed and fully open door positions. Between the fully closed and fully open door positions, the powered door 12 moves through three successive zones, as shown. As the door 12 is powered from the fully closed door position through zone one, the detection distance D of the sensing zone remains substantially constant as shown by line 60. This is because the range gate voltage applied to the radar sensors 22 and 32 is maintained at about 1.0 volt as shown by line 62.

When the powered door 12 transitions into zone two between an opening position of fifteen (15) degrees and sixty-five (65) degrees, the range gate voltage applied to the radar sensors 22 and 32 is increased linearly from about one volt to three volts as shown by line 62. This, in effect, adjusts the detection distance (bubble radius D) of the radar sensing zones so as to reduce the size of the sensing zones from a distance D of about forty (40) inches to a distance D of about twenty (20) inches at the end of the second zone. Accordingly, the sensing zone of each sensor is adjusted based on the sensed position φ of the movable powered door 12. The objection detection ability is maintained while the sensing zone is resized.

When the movable powered door 12 is in a position within the third zone, between sixty-five (65) degrees and the fully opened door position, the range gate voltage applied to the radar sensors 22 and 32 is maintained at about 3.0 volts so as to provide a constant detect distance D within zone three. Because the movable powered door 12 is nearing its fully open position in zone three, the object detection system 20 disables the ability to reverse the powered door 12 as shown by line 64. As a consequence, the powered door 12 is able to complete its transition to the fully opened door position, without undergoing a false alarm, such as may be caused by the door 12 approaching an overhead garage door 18, or other upper obstacle as may be present when the movable door 12 extends near its fully opened position.

Figure 5:
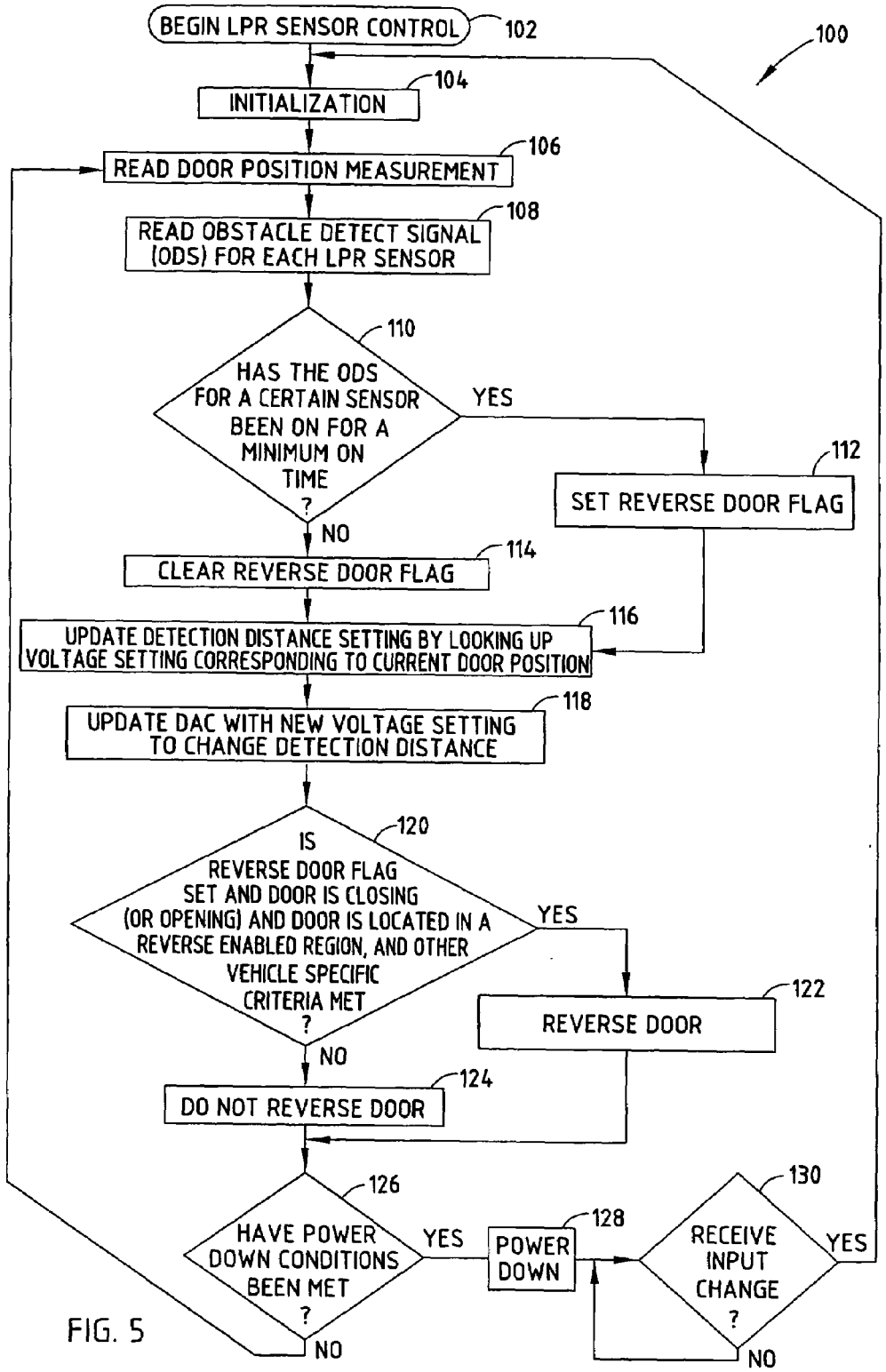
FIG. 5 is a flow diagram illustrating a method of detecting an object and controlling the powered door based on the object detection.

Referring to FIG. 5, a method (routine) 100 for detecting an object, including control of the sensors and control of the powered door 12, is shown therein. The method 100 begins at step 102 and performs an initialization in step 104. In step 106, method 100 reads the door position measurement as sensed by the door position sensor. In step 108, method 100 reads the obstacle detect signal (ODS) for each radar sensor. The ODS includes a processed signal indicating whether the corresponding radar sensor has detected an object present within the corresponding sensing zone.

In decision step 110, method 100 determines whether the ODS for a certain sensor has been on for a minimum on time, and if so, sets the reverse door flag in step 112 before proceeding to step 116. If not, method 100 clears the reverse door flag in step 114, and then proceeds to step 116. In step 116, method 100 updates the detection distance setting by looking up the voltage setting corresponding to the current door position. Next, method 100 updates the DAC with the new voltage setting to change (adjust) the detection distance, in step 118.

Proceeding to decision step 120, method 100 determines whether the reverse door flag is set and the door is closing (or alternately opening) and the door is located in a reverse enabled region, and other vehicle specific criteria has been met to cause the powered door to reverse and, if so, reverses the door in step 122. If the criteria in step 120 have not been met to cause the door to reverse, method 100 does not reverse the door in step 124. In either event, method 100 determines whether power down conditions have been met in step 126 and, if not, returns to step 106. If the power down conditions have been met, method 100 powers down in step 128 and proceeds to check whether input changes have been received in decision step 130. Method 100 waits until input changes are received and, when so, returns to step 104.

While the object detection system 20 and method of the present invention are shown and described herein in connection with detecting an object and controlling the actuation of a powered lift gate, it should be appreciated that the present invention is applicable to other powered doors. The powered door may include a powered door on the side of a vehicle, a powered door member, such as a sunroof on the roof of a vehicle, a powered glass window, and other powered members that are movable to open and close an opening.

Accordingly, the object detection system 20 of the present invention advantageously monitors the opening path of a powered door 12 on a vehicle 10 to detect an object, without requiring contact therewith. If an object is detected, the detection system 20 allows for the reversal of the powered door 12 within a limited range. The detection system 20 advantageously adjusts the sensing zone of the radar sensors 22 and 32 so as to optimize the detection of objects as the powered door 12 moves from a closed door position to an open door position. Additionally, the detection system 20 further prevents reversal of the powered door 12 when the door 12 nears its completely open door position. The detection system 20 of the present invention provides for a low cost and easy to implement system that prevents undesirable contact with obstacles that may prevent or inhibit opening of the powered door 12.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A detection system for detecting an object in relation to a movable door, said detection system comprising:
    an object detection sensor located on a movable door for sensing an object within a sensing zone, said object detection sensor being adjustable to vary the size of the sensing zone;
    a door position sensor for sensing position of the door relative to at least one of open and closed door positions; and
    a controller operable coupled to the object detection sensor and the door position sensor and adapted to adjust the sensor to vary the size of the sensing zone of the object detection sensor as a function of the sensed door position.

2. The detection system as defined in claim 1, wherein the door is a powered door on a vehicle.

3. The detection system as defined in claim 2, wherein the powered door is a powered lift gate.

4. The detection system as defined in claim 1, wherein the object detection sensor is located so that the sensing zone covers the opening path of the door.

5. The detection system as defined in claim 1, wherein the controller further changes movement of the door when an object is sensed in the sensing zone.

6. The detection system as defined in claim 5, wherein the controller reverses direction of movement of the door when the object is sensed in the sensing zone.

7. The detection system as defined in claim 1, wherein the object detection sensor comprises a radar sensor.

8. The detection system as defined in claim 6, wherein the sensor comprises first and second radar sensors.

9. The detection system as defined in claim 6, wherein the radar sensor is a differential pulsed Doppler radar sensor having a dynamic range gate.

10. An object detection system for detecting an object in relation to a movable powered door on a vehicle, said detection system comprising:
   an object detection sensor located on a movable powered door on a vehicle for sensing an object within a sensing zone, said object detection sensor having a sensitivity that is adjustable to vary the size of the sensing zone;
   a door position sensor for sensing position of the movable powered door; and
   a controller operably coupled to the object detection sensor and the door position sensor and including means for adjusting the sensitivity of the object detection sensor as a function of the sensed door position to thereby vary the size of the sensing zone, wherein the controller further changes movement of the powered door when an object is sensed in the sensing zone.

11. The detection system as defined in claim 10, wherein the controller changes movement of the powered door so as to reverse direction of movement of the powered door upon detecting an object in the sensing zone.

12. The detection system as defined in claim 11, wherein the controller prevents reversal of direction of movement of the powered door once the powered door position reaches a predetermined position.

13. The detection system as defined in claim 1, wherein the object detection sensor is located so that the sensing zone covers the opening path of the door.

14. The detection system as defined in claim 10, wherein the powered door is a power lift gate.

15. The detection system as defined in claim 10, wherein the object detection sensor comprises a radar sensor.

16. The detection system as defined in claim 15, wherein the sensor comprises first and second radar sensors.

17. The detection system as defined in claim 15, wherein the radar sensor is a differential pulsed Doppler radar sensor having a dynamic range gate.

18. A method of detecting an object in relation to a movable door, said method comprising the steps of:
   locating a object detection sensor on the movable door, said object detection sensor having a sensing zone and being adjustable to vary the size of the sensing zone;
   sensing position of a movable door relative to at least one of open and closed door positions;
   adjusting the sensor to determine the size of the sensing zone as a function of the sensed door position to create an adjusted sensing zone; and
   sensing the presence of an object within the adjusted sensing zone.

19. The method as defined in claim 18 further comprising the step of changing movement of the door when the object is sensed in the sensing zone.

20. The method as defined in claim 19, wherein the step of changing movement of the door comprises reversing direction of movement of the door when the object is sensed in the sensing zone.

21. The method as defined in claim 18, wherein the adjusted sensing zone is in the opening path of the door.

22. The method as defined in claim 18, wherein the step of sensing the presence of the object comprises transmitting and receiving radar signals.

23. The method as defined in claim 22, wherein said step of transmitting and receiving radar signals comprises transmitting and receiving radar signals with a differential pulsed Doppler radar sensor having a dynamic range gate.

24. The method as defined in claim 18, wherein the step of sensing position of the door comprises sensing position of a powered door on a vehicle.

25. The method as defined in claim 24, wherein the powered door comprises a powered lift gate.

* * * * *